3,562,306
PREPARATION OF ZINC DIHYDROCARBON-
SUBSTITUTED DITHIOPHOSPHATE
Eli W. Blaha and Roger W. Watson, Highland, Ind., assignors to Standard Oil Company, Chicago, Ill., a corporation of Indiana
No Drawing. Filed Jan. 16, 1969, Ser. No. 791,772
Int. Cl. C07f 3/06
U.S. Cl. 260—429.9                                      8 Claims

ABSTRACT OF THE DISCLOSURE

Zinc dihydrocarbon-substituted dithiophosphates, and in particular zinc diaryl dithiophosphates, are prepared by neutralizing the dihydrocarbon-substituted dithiophosphoric acid with zinc oxide in the presence of a neutralization promoter which is a zinc salt such as zinc nitrate, zinc chloride, zinc sulphate, and the like; the zinc salt may be added as such or formed in situ by the addition of nitric acid, hydrochloric acid or sulfuric acid to the mixture of the dihydrocarbyl dithiophosphoric and sufficient zinc oxide to neutralize the dithiophosphoric acid and to form promoting amounts of the inorganic zinc salt.

BACKGROUND OF THE INVENTION

The addition of zinc salts of various dihydrocarbon-substituted dithiophosphoric acid to lubricating oils to impart anti-corrosion and/or anti-oxidation properties thereto is well known. Such salts have the general formula:

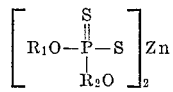

wherein $R_1$ and $R_2$ may be the same or different hydrocarbon radicals, such as alkyl, alkenyl, aryl, alkaryl, aralky and cyclo-aliphatic radicals.

The zinc salts are usually prepared by reacting $P_2S_5$ with the desired alcohol to obtain the di-substituted dithiophosphoric acid, and then neutrilizing the dihydrocarbon-substituted dithiophosphoric acid with zinc oxide to obtain the zinc salt.

Such zinc dihydrocarbon-substituted dithiophosphates have been found useful as additives for lubricating oils for internal combustion engines of the spark-ignition types and of the diesel engine types. For use in engines subjected to normal operating conditions the zinc dialkyl dithiophates are quite adequate. However, for engines subjected to high temperature operating conditions, the zinc diaryl or dialkaryl substituted dithiophosphates are particularly well adapted for such use because of their unusually high temperature stability.

While the dialkyl dithiophosphoric acids are readily neutralized with zinc oxide to form the corresponding zinc dialkyl dithiophosphates, the neutralization of the diaryl, or dialkaryl substituted dithiophosphoric acids with zinc oxide is more difficult, and usually results in products which are referred to as "sour." The term "sour" is applied to zinc oxide treated dihydrocarbon-substituted dithiophosphoric acids which are not completely neutralized, resulting in products having the mercapto, i.e. —SH, group. Products resulting from the neutralization of di-hydrocarbon-substituted dithiophosphoric acids with zinc oxide which are substantially free of products having no mercapto, i.e. —SH, group, are referred to as "sweet" products.

SUMMARY

In accordance with the present invention the neutralization of dihydrocarbon-substituted dithiophosphoric acids, in particular the diaryl or dialkaryl-substituted dithiophosphoric acids, with zinc oxide, to form the zinc salts of such acids, is facilitated by conducting such neutralization in the presence of small amounts of an inorganic zinc salt promoter; namely zinc nitrate, zinc chloride and zinc sulfate. The zinc salt promoter can be used in amounts of from about 0.01 to about 35 mole percent, and preferably from about 0.25 to about 2 mole percent, based on the zinc oxide used. While each of the inorganic zinc salt promoters are effective in facilitating the formation of sweet zinc dihydrocarbon-substituted dithiophosphates, they are not all equal in effectiveness; the zinc nitrate. being the most effective is preferred.

The preparation of the dithiophosphoric acid is convention as represented by the equation:

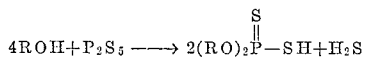

wherein R represents the same or different hydrocarbon radicals. In the preparation of the acid any aliphatic or aromatic alcohol can be used, provided at least one of the alcohols contains an aliphatic group of at least 5 carbon atoms, to provide oil-solubility to the product. Examples of suitable hydroxy compounds are aryl alcohol, 2-ethyl hexanol, nonyl alcohol, dodecyl alcohol, stearyl alcohol, amyl phenol, octyl phenol, nonyl phenol, methyl cyclohexanol, alkylated naphthols etc. When using mixtures of alcohols and/or phenols, it is possible to use a short chain hydroxy compounds with a hydroxy compound having at least 5 carbon atoms. For example, mixtures of isopropyl or methyl alcohol and 2-ethyl hexanol; isobutyl alcohol and octyl or nonyl alcohol; primary isobutyl alcohol and nonyl phenol; orthocresol and nonyl phenol etc.

In the preparation of the dihydrocarbon substituted dithiophosphoric acid any conventional method can be used, such as for example the preparations described in U.S. Pat. Nos. 2,552,570; 2,579,038; 2,689,220 and others. By way of illustration, in the preparation of a dialkaryl-substituted dithiophosphoric acid about 2 moles of $P_2S_5$ is mixed with about 8 moles of a selected alkylated phenol, e.g. nonyl phenol, at a temperature of about 135° F., the temperature of the mixture raised to about 150° F. for about 1 hour, maintained at about 200° F. for 2 hours, and then maintained a temperature of about 250° F. for 1.5 hours. During the last 15 minutes of the reaction period the mixture is blown with nitrogen.

Since the present invention is applicable to the preparation of the zinc salt of a dihydrocarbon-substituted dithiophosphoric acid prepared by any method, the preparation of the acid is not part of the present invention, and therefore it is not to be restricted to any conditions for the preparation of such dithiophosphoric acid which may be described herein, which are given by way of illustration only.

The zinc salt of the dihydrocarbon-substituted dithiophosphoric acid is prepared, in accordance with the present invention, by treating such acid with at least a stoichiometric amount, and preferably from about 5% to about 20% in excess of the stoichiometric amount of zinc oxide, in the presence of from about 0.01 to about 35 mole percent, and preferably from about 0.25 to about 2 mole percent, based on the zinc oxide use, of an inorganic zinc salt provided selected from the group consisting of zinc nitrate, zinc chloride and zinc sulfate. Neutralization with the zinc oxide can be carried out at temperatures of from about 70° F. to about 225° F., and suitably from about 140° F. to about 200° F. It is desirable to blow the neutralized mixture with nitrogen or other inert gas, to remove any water formed during the neutralization step.

The inorganic zinc salt promoter used in accordance with the present invention can be preformed prior to being added to the mixture of zinc oxide and the dihydrocarbon-substituted dithiophosphoric acid or the zinc salt promoter may be formed in situ. This can be readily done by using a sufficient amount of zinc oxide to form the desired inorganic zinc salt promoter and to neutralize the dithiophosphoric acid, and adding to the mixture of zinc oxide and the dithiophosphoric acid a sufficient amount of the acid, i.e., nitric acid, hydrochloric acid or sulfuric acid, to form the desired amount of the corresponding zinc salt promoter, i.e., zinc nitrate, zinc chloride or zinc sulfate. It is desirable to use the zinc oxide in an amount in excess of the stoichiometric amount to form the zinc dihydrocarbon-substituted dithiophosphoric acid on the zinc salt promoter.

When the zinc dihydrocarbon-substituted dithiophosphate is to be used as lubricating oil additive, it is desirable to conduct the reactions above described in the presence of a suitable hydrocarbon oil as a diluent.

While the present invention can be used for the preparation of any zinc dihydrocarbon-substituted dithiophosphate, it is especially useful for the preparation of zinc diaryl and/or dialkaryl substituted dithiophosphates.

PREFERRED EMBODIMENT

The preferred embodiment of this invention is illustrated by the following examples.

Example I

*Part A.*—A slurry of 444 grams (2.0 moles) of phosphorus sulfide and 888 grams of a solvent-extracted S.A.E. 5 petroleum oil was warmed to 135° F. and 1760 grams (8.0 moles) of nonyl phenol added to the heated slurry. The mixture was then heated at 150° F. for 1 hour, the temperature then raised to 200° F. and maintained at said temperature for 2 hours. The mixture was then heated to 250° F., and maintained at that temperature for 1.5 hours during the last 15 minutes of which time the mixture was blown with nitrogen. The reaction product was filtered through diatomaceous earth, and the dinonyl phenyl dithiophosphoric acid product, containing 4% phosphorus, recovered.

*Part B.*—A mixture of 544 grams (0.7 mole) of the dinonylphenyl dithiophosporic acid prepared in Part A, above, 130 grams of a solvent-extracted S.A.E. 5 petroleum oil, 34.0 grams (0.42 mole) of zinc oxide, and 1.3 grams (0.0042 mole) of zinc nitrate hexahydrate was heated with stirring at a temperature of 140° F. for 2 hours. The temperature was then raised to 200° F. and the mixture blown with nitrogen to remove the water formed during the neutralization. The reaction mixture was then filtered through diatomaceous earth. The recovered filtrate, of zinc dinonylphenyl dithiophosphate, was sweet and contained 3.5% zinc, 2.9% phosphorus and 6.0% sulfur.

Example II

*Part A.*—A dinonylphenyl dithiophosphoric acid was prepared as set forth in Part A of Example I, above.

*Part B.*—A mixture of 544 grams (0.7 mole) of the above dinonylphenyl dithiophosphoric acid, 34 grams (0.42 mole) of zinc oxide, 0.25 ml. (0.004 mole) of concentrated nitric acid, and 130 grams of the solvent-extracted S.A.E. 5 petroleum oil, was heated at 140° F. for 2 hours with stirring. The temperature was then raised to 200° F. and the mixture blown with nitrogen for 1 hour to remove water formed during neutralization. The reaction product was filtered through diatomaceous earth, and a filtrate containing the zinc dinonylphenyl dithiophosphate recovered. The recovered product was sweet, and contained 3.3% zinc, 2.9% phosphorus and 5.9% sulfur.

Example III

*Part A.*—A dinonylphenyl dithiophosphoric acid was prepared as described in Part A of Example I, above.

*Part B.*—The above acid was neutralized in the manner described in Part B of Example II, above, except that 0.6 ml. (0.007 mole) of concentrated hydrochloric acid was substituted for the nitric acid. The recovered filtrate was sweet and contained 3.5% zinc, 3.1% phosphorus and 6.2% sulfur.

Example IV

*Part A.*—A dinonylphenyl dithiophosphoric acid was prepared as described in Part A of Example I, above.

*Part B.*—The above acid was neutralized in the manner described in Part B of Example II, above, except that 1 ml. (0.018 mole) of concentrated sulfuric acid was substituted for the nitric acid, and the additional diluent oil (130 grams) were not added. The recovered filtrate was sweet, and contained 4.1% zinc, 3.7% phosphorus and 7.8% sulfur.

As noted above, while the present invention is applicable to the preparation of zinc dihydrocarbon-substituted dithiophosphates in general, it is particularly adaptable for the preparation of the zinc diaryl or dialkaryl-substituted dithiophosphates.

Percentages given herein and in the appended claims are weight percentages unless otherwise stated.

While the invention has been described with reference to certain specific preferred embodiments thereof, it is to be understood that it is not limited thereto, except as defined in the appended claims.

We claim:
1. In the method of preparing a zinc dihydrocarbon-substituted dithiophosphate wherein a dihydrocarbon-substituted dithiophosphoric acid is reacted with zinc oxide, the improvement comprising reacting the said dihydrocarbon-substituted dithiophosphoric acid with zinc oxide in the presence of a small amount of an inorganic zinc salt promoter selected from the group consisting of zinc nitrate, zinc chloride and zinc sulfate, said promoter being used in amounts of from about 0.01 to about 35 mole percent based on the zinc oxide used.

2. The method of claim 1 wherein the inorganic zinc salt promoter is preformed.

3. The method of claim 1 wherein the inorganic zinc salt promoted is formed in situ by adding to the mixture of zinc oxide and the dihydrocarbon-substituted dithiophosphoric acid an acid selected from the group consisting of nitric acid, hydrochloric acid and sulfuric acid.

4. The method of claim 1 wherein the dihydrocarbon-substituted dithiophosphoric acid is a diaryl-substituted dithiophosphoric acid.

5. The method of claim 1 wherein the dihydrocarbon-substituted dithiophosphoric acid is a dialkaryl-substituted dithiophosphoric acid.

6. The method of claim 5 wherein the dialkaryl-substituted dithiophosphoric acid is dinonylphenyl.

7. The method of preparing an oil-soluble sweet zinc dialkaryl-substituted dithiophosphate, comprising neutralizing a dialkaryl-substituted dithiophosphoric acid in which the alkaryl radical contains an alkyl group of at least 4 carbon atoms, by reaction with zinc oxide in the presence of a small amount of zinc nitrate, said zinc nitrate being used in an amount of from about 0.25 to about 2 mole percent based on the zinc oxide used.

8. The method of claim 7 wherein the dialkaryl-substituted dithiophosphoric acid is dinonylphenyl-substituted dithiophosphoric acid.

References Cited

UNITED STATES PATENTS

| | | | |
|---|---|---|---|
| 2,785,128 | 3/1957 | Popkin | 260—429.9X |
| 2,944,972 | 7/1960 | Welsh | 260—429.9X |
| 2,983,742 | 5/1961 | Boba et al. | 260—429.9 |
| 3,290,347 | 12/1966 | Miller | 260—429.9 |

TOBIAS E. LEVOW, Primary Examiner

H. M. S. SNEED, Assistant Examiner